United States Patent
Harley et al.

[15] 3,661,191
[45] May 9, 1972

[54] APPARATUS FOR FILLING CONTAINERS

[72] Inventors: Gerald Brunswick Harley, 8a Landscape Road, Warlingham; Graham Harley, Mallory Grove, The Chase, Kingswood; Peter Brunswick Harley, 32 Grenville Court, Rymen, London, all of England

[22] Filed: July 17, 1970

[21] Appl. No.: 55,730

[30] Foreign Application Priority Data

Aug. 6, 1969    Great Britain.....................39,412/69

[52] U.S. Cl. ..............................141/41, 73/290 R, 137/393, 141/198
[51] Int. Cl. .........................................B65b 3/18, B65b 3/30
[58] Field of Search........................73/290 R, 294, 298, 303; 116/109, 118 R; 137/205, 393; 141/39–41, 44, 46, 59, 86, 96, 195, 198, 226, 284

[56] References Cited

UNITED STATES PATENTS 3,277,914   10/1966   Manion..............................137/393 X
3,516,455   6/1970    Carter................................141/198 X

FOREIGN PATENTS OR APPLICATIONS 585,153   1/1947   Great Britain.........................141/86

*Primary Examiner*—Edward J. Earls
*Attorney*—Larson, Taylor and Hinds

[57]    ABSTRACT

Apparatus, particularly for filling bottles with liquid, is provided with a device both for withdrawing gas from above the liquid entering the bottle and for simultaneously supplying gas to the space above the liquid. Therefore, when the liquid rises to a suction probe through which the gas is withdrawn, and so stops the withdrawal of gas, an immediate gas pressure rise occurs in the said space. This pressure rise is sensed and the filling operation consequently terminated.

6 Claims, 5 Drawing Figures

APPARATUS FOR FILLING CONTAINERS

This invention relates to apparatus for filling containers, particularly bottles, with liquid or other material that can flow under gravity like a liquid, such as pulverized solids.

In one known form of apparatus a tubular probe is inserted through the open end of a bottle to the level, or just below the level, to which the bottle is to be filled, and air is discharged through the probe at a low pressure (such as 3 inches water gauge or less). This leaks to atmosphere until the tip of the probe is covered by the liquid, whereupon the air flow is reduced owing to the viscosity of the liquid and its surface tension so that a small increase in the pressure in the probe results. This change in pressure is used to terminate the filling operation by actuating a circuit containing pneumatic (e.g. fluidic) components, any appreciable delay being accommodated by locating the end of the probe at the appropriate level below the desired liquid level.

The aforesaid prior proposal has the disadvantage that the signal pressure differential is extremely small and so it has also been proposed to provide a greater and more lasting signal by applying suction (instead of pressure) to the probe, which results in liquid being drawn into the probe when it rises to the tip of the probe. To clear the probe immediately after the signal so as to prevent the liquid from entering the pneumatic circuit, it has been proposed to follow the suction by a pressure discharge of the liquid from the probe. However, this as the disadvantage that bubbles are blown into the liquid, which is unsatisfactory as the method is frequently required for filling frothy liquids. Moreover, many liquids tend to dry out under the purging air blast thus restricting or blocking the probe bore and thereby causing malfunctioning of the critically adjusted pneumatic circuit.

It is a primary object of the present invention to provide apparatus, in which the aforesaid disadvantages are essentially eliminated.

According to the invention, apparatus for controlling the filling of a container which is closed except for an opening at the top thereof includes a unit for closing the container except for passages through said unit, a passage through said unit for the passage of material in the form of liquid or solid particles with which the container is filled, a suction probe, constituting a second of the said passages, mounted to extend through the unit to a point below the container opening, means for withdrawing gas through this probe from above the said material while the container is being filled until the material seals the end of the probe, a third passage through the unit mounted to terminate in said container above the aforesaid point, pressure means for delivering gas through the third passage while the container is being filled, means for sensing a rise in gas pressure above the material when the material seals the suction probe, and means responsive to the sensing means for terminating the filling of the container. The detection of the rise in gas (usually air) pressure may be effected by way of the pressure probe constituted by the third passage or by any other convenient sensing device.

It will be appreciated that the apparatus may be arranged to provide a signal of ample strength reliably to trigger a sensitive circuit, that may contain fluidic or electronic components, for the purpose of cutting off the supply of liquid. The pressure probe is never wetted because it remains above the liquid, and can be kept blowing continuously throughout the operation of the apparatus. The suction probe need not be connected to the sensitive circuit and can include a simple liquid trap. It also can operate continuously and so may be self clearing and self wetting so as to prevent it from becoming blocked. In addition, the tip of the suction probe may be adjacent the filling tube to prevent dripping while the containers are being changed.

In order that the invention may be clearly understood and readily carried into effect, apparatus in accordance therewith will now be described by way of example, with reference to the accompanying drawings, in which.

Figure 1:
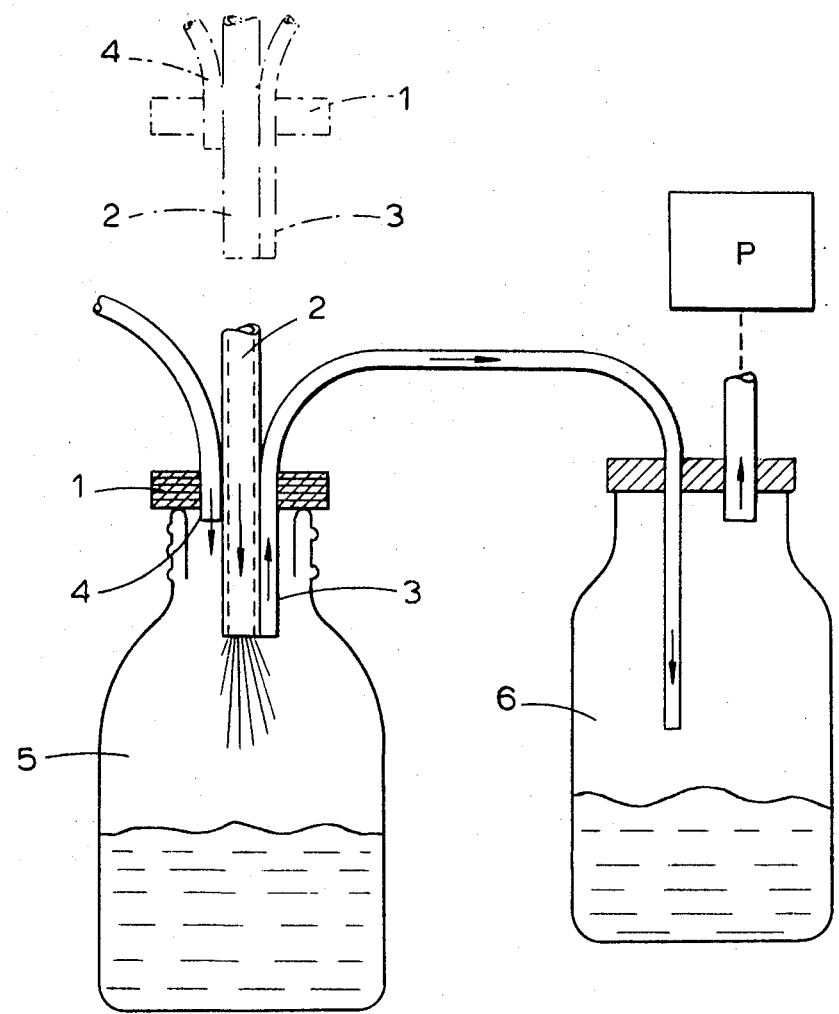
FIG. 1 is a diagrammatic sectional side elevation showing a portion of the apparatus with a bottle in the process of being filled.

Referring first to FIG. 1, a closure unit in the form of a sealing pad 1, carrying a filling tube 2, a suction or vacuum probe 3 and a pressure passage or probe 4 is brought down from the position shown in chain lines on to the top of a bottle 5 to be filled, so that the bottle is sealed except for the passages 2, 3, 4, which have flexible connections to permit the movement of the pad 1. During the filling by the admission of liquid through the tube 2, air is withdrawn through the suction tube 3 and air at a pressure of about one-half p.s.i. is delivered through the pressure probe 4. The rate at which air is removed through the suction probe 3 is approximately equal to the sum of the rate at which the air is displaced by the rising liquid in the bottle 5 and the rate at which air is blown into the bottle through the pressure probe 4.

When the rising liquid level reaches the tip of the suction probe 3 liquid is drawn into the probe 3 blocking the escape path for the air fed in by the pressure probe 4. Therefore, the air pressure in the space above the liquid rapidly increases providing a signal of ample strength to trigger the pneumatic circuit, described below, for the purpose of cutting off the supply of liquid into the bottle 5. The suction probe 3 is connected to a source P of vacuum by way of a conventional liquid trap 6 so that liquid drawn into the suction probe 3 does not find its way to the vacuum source. It will be seen that the tip of the suction probe 3 is at the same level as and adjacent to the end of the filling tube 2. This enables the suction probe 3 to withdraw drips from the end of the filling tube 2 when the filling is terminated and the sealing pad 1 raised. When the filling level is such that the end of the suction probe 3 is below the outlet of the filling tube 2, the suction probe may also withdraw drips at the appropriate time, but not when the end of the suction probe 3 is above the filling tube end.

Figure 2:
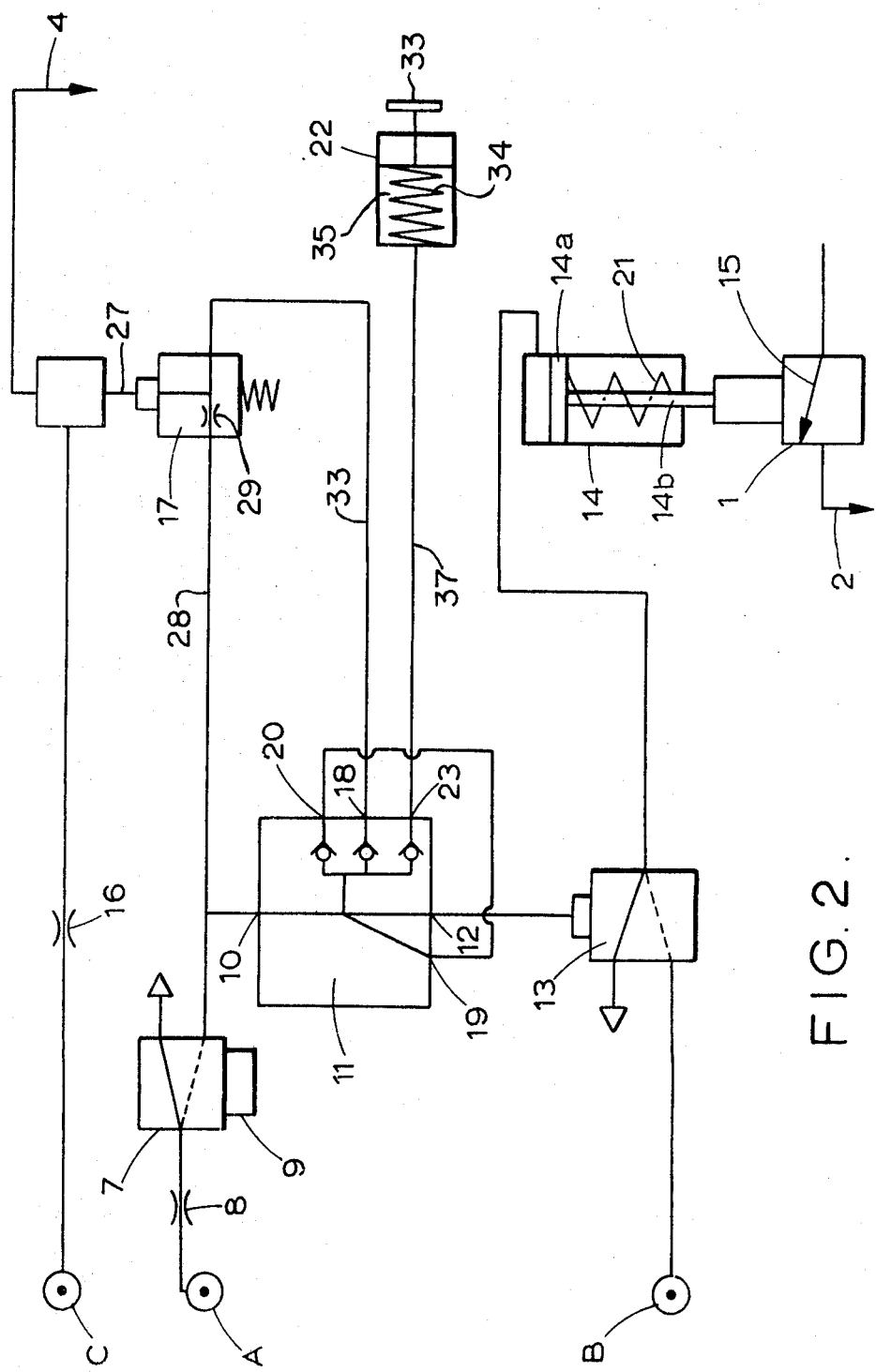
FIG. 2 is a diagram of a pneumatic circuit incorporated in the apparatus.
Figure 3:
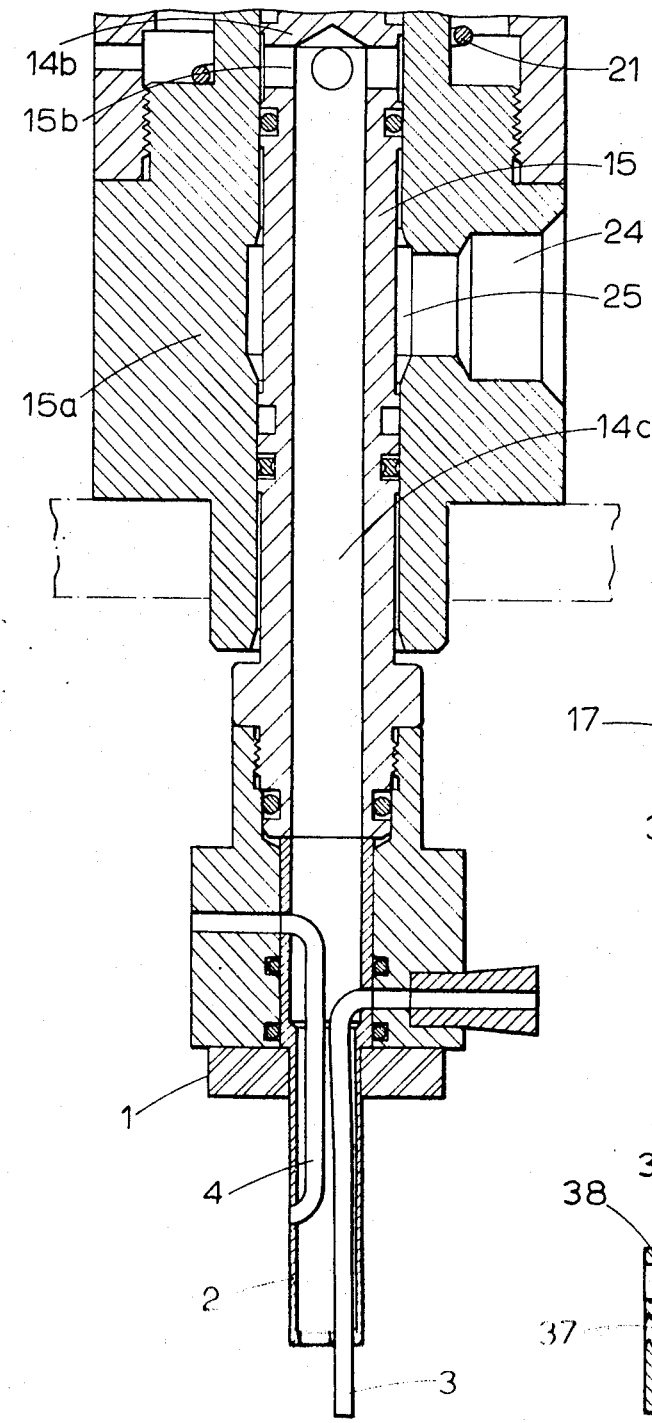
FIG. 3 is a sectional elevation showing part of a valve structure and bottle closure unit used in the apparatus.

Referring to FIG. 2, the filling cycle is started when a bleed valve 7, fed through a 0.01 inch restrictor 8 receiving from a source A air at a pressure between 6 and 9 p.s.i., is closed by a mechanical actuator 9 operated as a result of the arrival of a bottle at the position at which it is to be filled. A signal is therefore received at a port 10 of a fluidic relay constituted by an "OR-NOR" fluidic module 11 from which the output emerges through a port 12 and passes to a booster valve 13 which relays a high pressure source of air at 40 p.s.i. from a source B to a cylinder 14 to cause a piston 14a therein to bring the sealing pad 1 to the top of the bottle and mechanically to actuate a valve 15 to admit the liquid to the filling tube 2. The bottle filling then begins immediately because the suction probe 3 is continuously connected to the vacuum probe and the pressure probe 4 is connected continuously through a 0,01 inch restrictor 16 to a half p.s.i. pressure source C. The liquid supply valve 15 is indicated purely schematically in FIG. 2 and in detail in FIG. 3. In practice, the piston 14a has a piston rod 14b that is tubular at its lower end. This tubular part 14c of the piston rod provides at its lower end the filling tube 2 and reciprocates in a stationary sleeve 15a located some distance above the pad 1. The liquid is supplied laterally through an inlet 24 to an annular recess in the sleeve 15a with which ports 15b in the tubular part of the rod 14b register when the piston 14a is depressed against the action of a spring 21. The ports are located so that the valve 15 opens just before the pad 1 seals against the bottle neck and remains open until just after the pad 1 leaves the bottle neck.

When the bottle has been filled so that the suction through the probe 3 is interrupted and the pressure in the probe 4 is thereby increased, this pressure increase is sensed by a diaphragm amplifier 17 (described in detail below) which relays pressure from the source A, by way of the bleed valve 7, to a port 18 of the module 11. This actuates the module 11 to switch its output from the port 12 to a port 19 through which pressure derived from the source A is delivered to a port 20 to hold the module 11 in this condition until the bleed valve 7 is actuated to disconnect the connection to the port 10.

When the module output is switched from the port 12 to the port 19, the booster valve 13 disconnects the cylinder 14 from the source B and allows one spring 21 to lift the pad 1 from the bottle, the liquid supply valve 15 being closed by this action.

The filled bottle can now be removed so as to permit the actuator 9 to close the bleed valve 7 to disconnect the pressure source A from the module 11 and the diaphragm amplifier 17.

Manual means are provided for interrupting the supply of liquid in an emergency, such as the presence of a broken bottle. These means comprise a spring loaded press-button actuated piston device 22 (described in detail below) whereby a pulse of air can be delivered to a port 23 of the module 11. The effect of such a pulse is the same as that of the pulse applied to the port 18 through the diaphragm amplifier 17, the module output being switched from the port 12 to the port 19 and the pad 1 being lifted from the bottle.

The various individual units shown in FIG. 2 are not new in themselves and will be familiar to those skilled in fluidic circuits, so that further description of these is thought to be unnecessary. The speed at which these units react is such that the liquid flow ceases before any pressure build up can occur that would result in overfilling or distention of a flexible bottle or other container.

Figure 4:
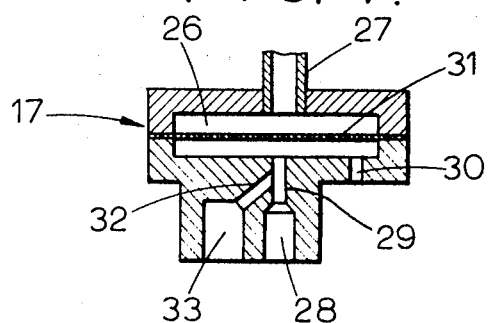
FIG. 4 is a diagrammatic sectional elevation of a diaphragm valve used in the apparatus.

The diaphragm amplifier 17 is shown in greater detail in FIG. 4 and contains a diaphragm chamber 26 connected by a tube 27 to the probe 4. A tube 28 connects the bleed valve 7 to a narrow orifice 29 from which the air can leak to atmosphere through a vent 30. When, however, the pressure in the probe 4 increases, a diaphragm 31 is deflected to close the orifice 29, so that the full pressure from the bleed valve 7 is applied through a duct 32 and a tube 33 to the port 18 in the module 11.

Figure 5:
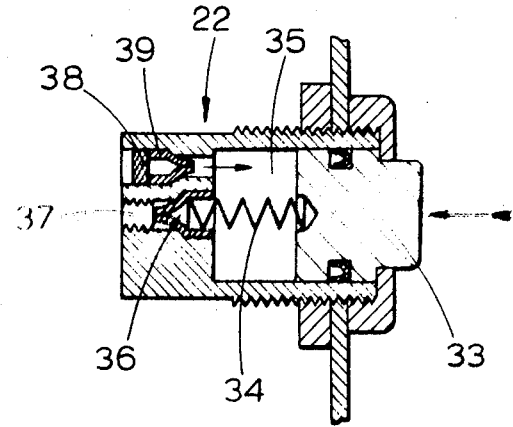
FIG. 5 is a sectional elevation of a press-button piston device used in the apparatus.

The press-button actuated piston device 22 is shown schematically in FIGS. 2 and in detail in FIG. 5. When a button 33 is pressed against the action of a spring 34 air in a chamber 35 is forced through a non-return valve 36 and tube 37 to the port 23 in the module 11. When the button is released, it draws air into the chamber 35 through a filter 38 and non-return valve 39.

We claim:

1. Apparatus for controlling the filling of a container which is closed except for an opening at the top thereof, including a unit for closing the container except for passages through said unit, a filling passage means through said unit for the passage of flowable material with which the container is filled, distinguished by the feature that there are two further passages through said unit consisting of a suction probe having its end substantially at the level to which the container is to be filled, and a pressure passage means through which gas is delivered under pressure while the container is being filled, the outlet of said pressure passage means being above said end of said suction probe, means being provided for withdrawing gas through said suction probe until the level of the material entering said container rises to a level at which it seals said probe, means being also provided for delivering gas under pressure through said pressure passage means while said container is being filled, further means being provided for sensing a rise in gas pressure above the material when the material seals said suction probe, and means responsive to said sensing means being provided for terminating the filling of the container.

2. Apparatus according to claim 1, distinguished by the feature that said sensing means are connected to said pressure passage means to sense a rise in pressure therein.

3. Apparatus according to claim 2, distinguished by the feature that said sensing means comprise a fluidic relay device sensitive to a rise in pressure in said pressure passage means and operative on said means for terminating the filling of the container.

4. Apparatus according to claim 3, distinguished by the feature that a manually operable member for creating a fluid pulse is operatively connected to said fluidic relay, so that a manually created pulse can be transmitted to said relay for terminating the filling operation in the event of an emergency.

5. Apparatus according to claim 1 distinguished by the feature that reciprocating means under control of said sensing means are provided for applying said closure unit together with said filling passage means, said suction probe and said pressure passage means to said container and for withdrawing same from said container, and that a valve is arranged automatically to control the feeding of the material through said filling passage means in accordance with the positioning of said closure unit, said means for withdrawing gas through said suction probe and for applying gas pressure through said pressure passage means being arranged to function continuously during the functioning of the apparatus.

6. Apparatus according to claim 1 distinguished by the feature that said end of said suction probe is disposed adjacent and at least as low as the outlet of said filling passage means so as to enable said suction probe to remove drips from said outlet.

* * * * *